(12) United States Patent
Wang et al.

(10) Patent No.: US 12,531,738 B2
(45) Date of Patent: Jan. 20, 2026

(54) SECURE MULTI-PARTY COMPUTATION WITH ATTESTATION USING A TRUSTED EXECUTION ENVIRONMENT

(71) Applicant: Google LLC, Mountain View, CA (US)

(72) Inventors: Gang Wang, Frederick, MD (US); Marcel M. Moti Yung, New York, NY (US); Sheldon I. Walfish, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 209 days.

(21) Appl. No.: 18/285,704

(22) PCT Filed: Apr. 25, 2023

(86) PCT No.: PCT/US2023/019697
§ 371 (c)(1),
(2) Date: Oct. 5, 2023

(87) PCT Pub. No.: WO2023/219787
PCT Pub. Date: Nov. 16, 2023

(65) Prior Publication Data
US 2025/0080349 A1 Mar. 6, 2025

(30) Foreign Application Priority Data
May 13, 2022 (IL) .......................................... 292998

(51) Int. Cl.
*H04L 29/06* (2006.01)
*G06F 21/53* (2013.01)
*H04L 9/32* (2006.01)

(52) U.S. Cl.
CPC ............ *H04L 9/3213* (2013.01); *G06F 21/53* (2013.01); *H04L 9/3247* (2013.01); *H04L 2209/46* (2013.01)

(58) Field of Classification Search
CPC . H04L 9/3213; H04L 9/3247; H04L 2209/46; H04L 63/0869; H04L 63/0876;
(Continued)

(56) References Cited

U.S. PATENT DOCUMENTS 9,577,829 B1    2/2017  Roth et al.
11,381,600 B1 *  7/2022  Wang ................... H04L 63/168
(Continued)

FOREIGN PATENT DOCUMENTS

CN          111082934      4/2020
WO       WO 2022199290      9/2022

OTHER PUBLICATIONS

International Preliminary Report on Patentability in International Appln. No. PCT/US2023/019697, mailed on Nov. 28, 2024, 9 pages.

(Continued)

*Primary Examiner* — Malcolm Cribbs
(74) *Attorney, Agent, or Firm* — Fish & Richardson P.C.

(57) ABSTRACT

Disclosed herein are systems, methods, and computer-readable media for enabling more secure multi-party computations (MPCs) using a trusted execution environment (TEE). In one aspect, a method includes executing, by a first MPC computer, a secure MPC protocol in a first TEE of the first MPC computer. The first MPC computer generates a request to a second MPC computer executing the secure MPC protocol in a second TEE of the second MPC computer. The first TEE determines that one or more attestation conditions are met by the first MPC computer executing the secure MPC protocol in the first TEE. In response to determining that the one or more attestation conditions are met, the first TEE generates an attestation token including one or more digital signatures for the secure MPC protocol executing in (Continued)

the first TEE. The first MPC computer sends the attestation token with the request to the second MPC computer.

19 Claims, 5 Drawing Sheets

(58) Field of Classification Search
CPC ....... H04L 63/20; H04L 63/205; G06F 21/53; G06F 21/57
See application file for complete search history.

(56) References Cited

U.S. PATENT DOCUMENTS

| | | | |
|---|---|---|---|
| 11,621,833 B2 | 4/2023 | Wright et al. | |
| 2011/0131627 A1* | 6/2011 | Abendroth | H04L 63/0815 726/1 |
| 2018/0212971 A1 | 7/2018 | Costa | |
| 2020/0014546 A1 | 1/2020 | Karame et al. | |
| 2021/0152343 A1* | 5/2021 | Yu | H04L 9/0618 |
| 2022/0014456 A1* | 1/2022 | Bandi | H04L 43/10 |
| 2022/0108026 A1* | 4/2022 | Ortiz | G06F 12/1408 |
| 2022/0164458 A1* | 5/2022 | Petri | H04L 9/0643 |
| 2024/0045968 A1* | 2/2024 | Sood | G06F 21/57 |
| 2024/0176899 A1* | 5/2024 | Wei | G06F 21/602 |

OTHER PUBLICATIONS

International Search Report and Written Opinion in International Appln. No. PCT/US2023/019697, mailed on Aug. 16, 2023, 14 pages.
Wikipedia.org [online], "Secure multi-party computation," available on or before Jan. 21, 2024, via Internet Archive: Wayback Machine URL <https://web.archive.org/web/20240121115926/https://en.wikipedia.org/wiki/Secure_multi-party_computation>, retrieved on Jan. 22, 2024, URL<https://en.wikipedia.org/wiki/Secure multi-party computation>, 13 pages.
Wikipedia.org [online], "Trusted execution environment," available on or before Dec. 22, 2023, via Internet Archive: Wayback Machine URL <https://web.archive.org/web/20231222041422/https://en.wikipedia.org/wiki/Trusted_execution_environment>, retrieved on Jan. 22, 2024, URL<https://en.wikipedia.org/wiki/Trusted_execution_environment>, 12 pages.
Extended European Search Report in European Appln. No. 24193540.2, mailed on Oct. 31, 2024, 6 pages.

* cited by examiner

SECURE MULTI-PARTY COMPUTATION WITH ATTESTATION USING A TRUSTED EXECUTION ENVIRONMENT

CROSS-REFERENCE TO RELATED APPLICATIONS

This application is a National Stage Application under 35 U.S.C. § 371 and claims the benefit of International Application No. PCT/US2023/019697, filed Apr. 25, 2023, which claims the benefit of priority to Israeli Application Serial No. 292998, filed May 13, 2022. The foregoing applications are incorporated herein by reference in their entirety for all purposes.

TECHNICAL FIELD

This specification relates to cryptography and data security.

BACKGROUND

Secure multi-party computation (MPC) is a family of cryptographic protocols that prevents access to data by distributing computations across multiple parties such that no individual party can access another party's data or intermediate computed values, while outputs are released only to designated parties. The MPC computing systems typically perform the computations using secret shares or other encrypted forms of the data and secure exchange of information between the parties.

SUMMARY

This specification describes technologies relating to protecting the security and privacy of information of multiple entities using secure MPC protocols that are used to perform secure computations in trusted execution environments (TEEs).

In general, one innovative aspect of the subject matter described in this specification can be embodied in methods that include executing, by a first multi-party computation (MPC) computer, a secure MPC protocol in a first trusted execution environment (TEE) of the first MPC computer; generating, by the first MPC computer, a request to a second MPC computer executing the secure MPC protocol in a second TEE of the second MPC computer; determining, by the first TEE, that one or more attestation conditions are met by the first MPC computer executing the secure MPC protocol in the first TEE; in response to determining that the one or more attestation conditions are met, generating, by the first TEE, an attestation token including one or more digital signatures for the secure MPC protocol executing in the first TEE; and sending, by the first MPC computer, the attestation token with the request to the second MPC computer. Other implementations of this aspect include corresponding apparatus, systems, and computer programs, configured to perform the aspects of the methods, encoded on computer storage devices.

These and other implementations can each optionally include one or more of the following features. In some aspects, the request includes a header. The operations can include inserting the attestation token into the header of the request. In some aspects, the attestation token includes request parameters of the request.

In some aspects, the one or more digital signatures for the secure MPC protocol of the attestation token includes at least one of (i) a first digital signature of the secure MPC protocol, (ii) a second digital signature of the first TEE generated by a manufacturer of the first TEE or (iii) a third digital signature of an operating system of the first TEE generated by a provider of the operating system.

In some aspects, determining that the one or more attestation conditions are met by the first MPC computer executing the secure MPC protocol in the first TEE includes determining that an MPC application executing the secure MPC protocol is running securely in the first TEE on the first MPC computer. In some aspects, determining that the one or more attestation conditions are met by the first MPC computer executing the secure MPC protocol in the first TEE includes determining that the first TEE is running a predetermined codebase for the secure MPC protocol. The predetermined codebase can include code certified to implement the secure MPC protocol without malicious operations.

Some aspects include generating, by the first MPC computer, a second request to the second MPC computer executing the secure MPC protocol in the second TEE, determining, by the first TEE, that the one or more attestation conditions are not met by the first MPC computer executing the secure MPC protocol in the first TEE, and sending, by the first MPC computer, the second request to the second MPC computer. The second request does not include any attestation token. The second MPC computer can be configured to stop executing the secure MPC protocol upon receiving the second request that does not include any attestation token.

Some aspects include generating, by the first MPC computer, a second request to the second MPC computer executing the secure MPC protocol in the second TEE, determining, by the first TEE, that the one or more attestation conditions are not met by the first MPC computer executing the secure MPC protocol in the first TEE, and sending, by the first MPC computer, the second request to the second MPC computer. The second request can include a second attestation token including data indicating that at least one attestation condition is not met. The second MPC computer can be configured to stop executing the secure MPC protocol upon receiving the data indicating that the first MPC computer is not trustworthy.

In some aspects, the secure MPC protocol is based on an honest-but-curious threat model. Executing the secure MPC protocol in the first TEE and the second TEE satisfies a malicious threat model.

In general, another innovative aspect of the subject matter described in this specification can be embodied in methods that include executing, by a first MPC computer, a secure MPC protocol in a first TEE of the first MPC computer; generating, by the first MPC computer for sending to a key management server, a key request to retrieve a decryption key for decrypting requests received from a second MPC computer executing the secure MPC protocol in a second TEE of the second MPC computer; determining, by the first TEE, that one or more attestation conditions are met by the first MPC computer executing the secure MPC protocol in the first TEE; in response to determining that the one or more attestation conditions are met, generating, by the first TEE, an attestation token including one or more digital signatures for the secure MPC protocol executing in the first TEE; sending, by the first MPC computer and to the key management server, the attestation token with the key request to retrieve the decryption key; receiving, by the first MPC computer and from the key management server, the decryption key after the key management server verifies the attestation token included in the key request; receiving one or more requests from the second MPC computer; and decrypting each of the one or more requests using the decryption key. Other implementations of this aspect include corresponding apparatus, systems, and computer programs, configured to perform the aspects of the methods, encoded on computer storage devices.

These and other implementations can each optionally include one or more of the following features. Some aspects include generating an encrypted request by encrypting, by the first MPC computer, a request to the second MPC computer using an encryption key of the second MPC computer and sending, by the first MPC computer, the encrypted request to the second MPC computer executing the secure MPC protocol in the second TEE.

In some aspects, the key request includes a header. The operations can include inserting the attestation token into the header of the key request. In some aspects, the one or more digital signatures for the secure MPC protocol of the attestation token includes at least one of (i) a first digital signature of the secure MPC protocol, (ii) a second digital signature of the first TEE generated by a manufacturer of the first TEE, or (iii) a third digital signature of an operating system of the first TEE generated by a provider of the operating system.

In some aspects, determining that the one or more attestation conditions are met by the first MPC computer executing the secure MPC protocol in the first TEE includes determining that an MPC application executing the secure MPC protocol is running securely in the first TEE on the first MPC computer. In some aspects, determining that the one or more attestation conditions are met by the first MPC computer executing the secure MPC protocol in the first TEE includes determining that the first TEE is running a predetermined codebase for the secure MPC protocol. The predetermined codebase can include code certified to implement the secure MPC protocol without malicious operations.

Some aspects includes generating, by the first MPC computer, a second request to the second MPC computer, determining, by the first TEE, that the one or more attestation conditions are not met by the first MPC computer executing the secure MPC protocol in the first TEE, and sending, by the first MPC computer, the key request to the key management server. The second request does not include any attestation token. The request without attestation token inserted by the TEE is configured to trigger the key management server to send a notification to the second MPC computer to stop executing the second MPC protocol upon receiving the notification.

Some aspects include generating, by the first MPC computer, a second request to the second MPC computer, determining, by the first TEE, that the one or more attestation conditions are not met by the first MPC computer executing the secure MPC protocol in the first TEE, and sending, by the first MPC computer, the key request to the key management server. The second request can include a second attestation token including data indicating that that at least one attestation condition is not met. The data indicating that the first MPC computer is not trustworthy triggers the key management server to send a notification to the second MPC computer to stop executing the second MPC protocol upon receiving the notification.

In some aspects, the secure MPC protocol is based on an honest-but-curious threat model. Executing the secure MPC protocol in the first TEE and the second TEE satisfies a malicious threat model.

The subject matter described in this specification can be implemented in particular embodiments so as to realize one or more of the following advantages. Integrating secure MPC protocols with a TEE at each MPC computer to perform computations prevents MPC parties from deviating from the MPC protocol, e.g., performing malicious actions, running external software, having additional communication with other parties, etc., and ensures that the MPC parties only perform actions designated by the MPC protocol. The techniques described in this document, by integrating the MPC protocol with TEE technology in ways that ensure that the MPC protocols are being followed appropriately without any unauthorized operations, enhances a MPC protocol designed under a weaker threat model, e.g., the honest-but-curious threat model, to function properly under a stronger threat model, e.g., the malicious adversary threat model, while maintaining information security and privacy. In the honest-but-curious model, it is assumed that each MPC party will not launch an attack on any other MPC party. However, the MPC party can observe and learn from the various network traffic between the MPC parties during the secure computations.

In some cases, a malicious MPC party may attempt to deviate from the MPC protocol in an arbitrary fashion. However, integrating the MPC protocol in TEEs and using attestation as described in the document prevents such attempts, thereby protecting the security of the data even in situations where one of the MPC parties is malicious or compromised. For example, if the TEE of a particular MPC computer cannot attest to the MPC protocol being executed in a secure and uncompromised environment and/or to the code being used to execute the MPC protocol is an official build of a certified codebase, the other MPC computer(s) participating in the secure MPC process can stop communicating with the particular MPC computer to prevent the particular MPC computer from accessing the confidential data in plaintext and/or performing other malicious operations using the secure MPC process.

The MPC protocol described herein can be significantly faster, simpler, and require less network communication costs, e.g., consumed bandwidth, than MPC protocols designed for stronger threat models. For example, unlike traditional MPC protocols under the malicious adversary threat model that would require the use of zero-knowledge computations that slow down the protocol and increase the communication costs, the MPC protocol as disclosed herein integrated with TEE can effectively prevent malicious adversary deviations from the MPC protocol with significantly less computation and communication costs required than traditional MPC protocols that meet similar security levels. In other words, integrating secure MPC computations using a TEE at each party that participates in performing computations using the secure MPC protocol reduces communication costs i.e., network bandwidth used, between the MPC computers and reduces the complexity of the MPC protocol, while still achieving higher levels of data security than more complex MPC protocols that are executed outside of a TEE.

Reducing the complexity of the MPC protocol also enables the protocol to be verified, tested, and debugged more efficiently than more complex protocols, and also reduces development time, cost, and effort, making the development of the protocol faster, more efficient, and scalable. The disclosed combination of TEE with MPC provides a defense-in-depth infrastructure that significantly improves the overall security protection of the system.

The MPC techniques described in this document advantageously ensures that, for each MPC application running on an MPC computer, the MPC protocol is executed within a TEE, and the TEE monitors execution of the MPC protocol so that the TEE can attest that the MPC protocol is running in a secure, uncompromised environment and that the MPC protocol is being executed by an official build of a pre-certified codebase. In response to determining that the attestation conditions are met at an MPC computer, the TEE of the MPC computer can insert an attestation token into a communication being sent to another MPC computer that participates in the secure MPC process. When the attestation token is absent or cannot be verified successfully, the receiving MPC computer can assume that the other MPC computer or the MPC code (e.g., an MPC application) running in its TEE has been compromised.

The MPC techniques described in this document can advantageously utilize a key management server (KMS) that offloads the attestation token checking operations from individual MPC computers. The MPC application executing within the TEE of an MPC computer can send, to the KMS, a key request to retrieve a decryption key, e.g., its own decryption key. The TEE can insert an attestation token into the key request. Only if the attestation token is verified to be valid, the KMS sends the decryption key to the MPC application. The MPC application can use the decryption key retrieved from the KMS to decrypt communications received from the MPC application of the other MPC computer(s). Using attestation in this way ensures to each MPC application that the other MPC applications with which the MPC application is communicating is secure and uncompromised. If this attestation fails, the MPC application on the compromised computer will not be able to receive its decryption key from the KMS, therefore the MPC application cannot decrypt the communications received from the MPC application running on other MPC computer(s) and cannot continue the MPC protocol. The MPC application on other MPC computer(s) can quit communicating with the MPC application(s) on the compromised MPC computer(s) to prevent the occurrence of any fraudulent activity, thereby protecting any sensitive data on which computations are being performed.

The existing "showing that a party following a MPC protocol" may be based only on the MPC protocol. However, the integration of MPC and TEE techniques described herein shifts the MPC party and the MPC protocol as a whole from working under the assumed honest-but-curious threat model to the much stronger malicious adversary model. The execution of the MPC protocol within the TEE and the TEE attesting to an honest-but-curious protocol advantageously results in a correct and secure malicious adversary model protocol.

The integration of MPC protocols for performing computations within TEEs of each MPC party's computer and the use of attestation in this infrastructure as described in this document provides a synergistic effect of faster, more efficient secure computations that require less data to be transmitted over a network that connects the MPC computers and enhances MPC protocols developed to satisfy the honest but curious threat model to satisfy higher level threat models (e.g., the malicious adversary threat model) that can detect malicious attacks launched by MPC parties without any changes to the MPC protocol (or at least with minimal changes). This allows such honest but curious MPC protocols to be deployed at scale, e.g., on many servers and in many different applications, to satisfy the higher level threat models.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, this document describes systems and techniques for integrating secure MPC and TEE technologies to provide secure communications between MPC parties and to prevent deviations from the MPC protocol, such as malicious or adversary activities, external software, or additional unauthorized communication with other parties.

Figure 1:
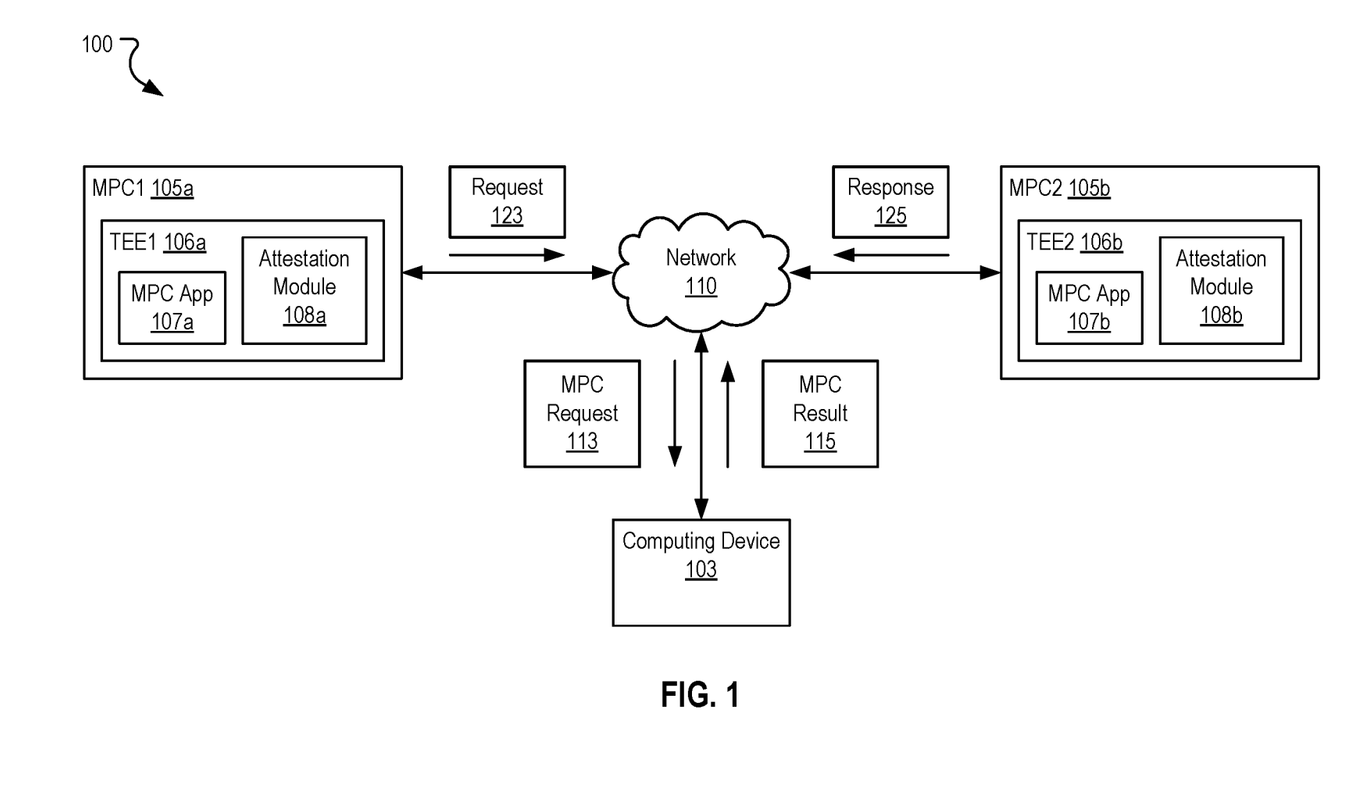
FIG. 1 is a block diagram of an environment in which example MPC applications execute MPC protocols within TEEs of MPC computers to perform secure computations.

FIG. 1 is a block diagram of an environment 100 in which example MPC applications 107 execute MPC protocols within TEEs 106 of MPC computers 105 to perform secure computations. The example environment 100 includes a data communication network 110, such as a local area network (LAN), a wide area network (WAN), the Internet, a mobile network, or a combination thereof. The network 110 connects MPC computers 105, e.g., MPC computers 105a and 105b and a computing device 103. The example environment 100 can include many different computing devices 103 and MPC computers 105.

A computing device 103 is an electronic device that is capable of communicating over the network 110. As described in further detail below, the computing device 103 can send, to the MPC computers 105, requests for the MPC computers 105 to perform secure computations. In other examples, the MPC computers 105 can collaboratively perform secure computations independent of the computing device 103, e.g., to perform computations in ways that keep each MPC computer's data private and secure from the other MPC computer(s) that participate in the secure computations.

Example computing devices 103 include personal computers, mobile communication devices, e.g., smart phones, and other devices that can send and receive data over the network 110. A computing device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A computing device 103 can also include a digital media device, e.g., a streaming device that plugs into a television or other display to stream videos to the television, a gaming console, or a virtual reality system.

Each MPC computer 105 can be implemented as one or more servers that include a TEE 106. The TEE 106 is a computing environment where the code that is executed and the data that is being accessed in the TEE 106 is isolated and protected in terms of confidentiality and integrity. The TEE 106 can be implemented using both computer hardware and software. For example, the TEE 106 can include a hardware isolation mechanism and software, e.g., an operating system, executing on the hardware isolation mechanism. The TEE 106 can be a secure area of a computer processor that guarantees the confidentiality and integrity of applications executing in the TEE 106 and data loaded in the TEE 106. Each MPC computer 105 can be managed and/or maintained by a respective MPC party, e.g., an entity that participates in the secure computations performed by the MPC computers 105.

The TEE 106 can be implemented based on hardware support built into the central processing unit (CPU) of the MPC computer 105. The TEE 106 can be maintained based on a hardware chain-of-trust, starting with the manufacturer of the CPU, and optionally include the manufacturer of the operating system, and the manufacture of the TEE 106. The TEE 106 allows trusted applications to run within the TEE 106 to protect and prove that such trusted applications are free from exfiltration by cloud providers or malicious hosting environment or operating systems.

The TEE 106 effectively detects external parties that illegally access data of applications or data within the TEE 106. The TEE 106 also determines whether software running within the TEE 106 is compromised or not, e.g., the software acts to abuse private data. However, the TEE 106 by itself may not be able to address security and privacy threat that software runs in the TEE 106, with access to the private data, performs privacy violations by some computations on the side. For example, MPC parties may intentionally and officially develop their software to collect, share, and consume private data at scale in a way that is without meaningful consent or restrictions. The present disclosure integrates TEE and MPC protocol to specifically address such limitations of the TEE.

The TEE 106 of each MPC computer 105 includes one or more processors, an operating system (OS), and one or more software applications running therewithin. In this example, the TEE 106 of each MPC computer 105 includes an MPC application 107 and an attestation module 108. For example, the TEE 106a of MPC computer 105a includes an MPC application 107a and an attestation module 108a. Similarly, the TEE 106b of MPC computer 105b includes an MPC application 107b and an attestation module 108b. The attestation modules 108 can be part of their respective OSs. For example, each OS can include functionality and/or code to perform the functionality of the attestation module 108.

Each MPC application 107 executes an MPC protocol to perform secure multi-party computations, which are also referred to herein as secure computations, with MPC applications 107 running on one or more other MPC computers 105. For example, the MPC application 107a executes an MPC protocol to perform secure computations in collaboration with the MPC application 107b, which also executes the MPC protocol. Although the example environment 100 includes two MPC computers 105a and 105b that include MPC applications 107a and 107b, respectively, that execute a two-party MPC protocol, additional MPC computers 105 can be included with respective MPC applications 107 to perform higher order MPC protocols.

The MPC protocol includes a computer codebase or program that allows two or more MPC parties to jointly compute functions based on their private input information and cryptographically guarantee that the input information remains private to all non-self MPC parties. In other words, neither the MPC computer 105b nor any other party would be able to access the private information of MPC computer 105a. Similarly, neither the MPC computer 105a nor any other party would be able to access the information of MPC computer 105b. The same MPC protocol can be executed by two or more MPC parties, e.g., two or more MPC computers 105 in the environment 100.

The MPC protocol can be designed to be secure under different security threat models, e.g., to meet the security guarantees required by at least one of the security threat models. In other words, when all MPC applications 107 perform activities described in the security threat model, the MPC protocol may continue to provide security guarantees to other MPC applications 107 and their respective MPC parties. In an honest-but-curious threat model, a malicious or adversarial party can be a legitimate participant in a MPC protocol who will not deviate from the defined protocol but will attempt to learn all possible information from legitimately received messages. The honest-but-curious threat model is not designed to prevent such attempts as it expects each MPC party to be a trusted participant. An example of a stronger threat model is a malicious threat model, where the threat model is designed to prevent MPC parties from actively deviating from the MPC protocol to undermine the security of the MPC protocol.

Based on different threat models, the MPC protocol may pose different levels of complexity to guarantee security of communications between MPC parties and the data stored by each MPC computer 105. For example, it is easier to design a MPC protocol under the honest-but-curious threat model than the malicious adversary threat model. MPC protocols under the honest-but-curious threat model are often faster and include less complexity.

Further, MPC protocols designed under the honest-but-curious threat model may require fewer network communications between MPC computers 105 and/or less computational cost than MPC protocols designed under the malicious adversary threat model, with comparable functionality. For example, the malicious adversary models may require the MPC protocol to add procedures like heavy zero-knowledge computations to prove to the other side that an MPC party and its MPC application 107 has properly followed the MPC protocol. Such procedures slow down the MPC protocol as well as add communication cost thereto. For example, such a procedure may require the MPC protocol to communicate information including a zero-knowledge proof that the party has performed and the computation leading to the message based on random bits to which the party committed, the private state of that party, and messages this party received in the previous round of the protocol. This added information assures that the party has acted correctly based on the protocol instructions and the party's state is typically very long consuming a lot of storage space and bandwidth. This turns the original honest but curious protocol into one where, although the parties can be malicious, they cannot due to the need to send the lengthy zero-knowledge proof attesting to the fact that the party followed the protocol. Integrating the MPC protocols with a TEE using attestation as described in this document improves the MPC technology so that the MPC protocol designed to ensure data security and privacy under a simpler model, e.g., the honest-but-curious model, can effectively provide the same security guarantees as a stronger and more complicated malicious adversary threat model without the complexity, communication costs, and computational costs typically required by the stronger threat models that require zero knowledge proofs.

Each TEE 106 can be configured to monitor the code that is executed within the TEE 106 to ensure that the MPC protocol is being followed without deviation and that no other operations are being performed within the TEE 106. Each TEE 106 includes an attestation module 108 (e.g., attestation module 108a of TEE 106a and attestation module 108b of TEE 108b) that is configured to generate attestation data that attests to the MPC protocol being followed faithfully and in a secure and isolated environment when a set of one or more attestation conditions are met. For example, the attestation data can attest to the fact that the MPC application 107 runs an official build of a codebase, which was previously certified to implement the MPC protocol faithfully and does not deviate from the MPC protocol (e.g., no malicious actions, no external software in the TEE 106 other than the MPC application 107 and the attestation module 108, and that no additional communication that is not part of the MPC protocol has been received or sent by any application in the TEE 106) and that the MPC application 107 is executed in a secure and uncompromised environment.

In some implementations, the attestation module 108 also performs the monitoring functions and an attestation condition can be that the attestation module 108 determines, based on the monitoring, that the MPC protocol is being executed appropriately. The monitoring can include checking the execution state of the MPC application 107 to ensure the appropriate MPC protocol is loaded and being executed. The monitoring can include the attestation module 108 collecting a set of signals that can indicate whether the appropriate MPC protocol is being executed faithfully. These signals can include, for example, data identifying types of communications sent from and received by the TEE 106 and the senders and recipients of those communications. The attestation module 108 can share those signals with a certification server that analyzes the signals for signs of compromise or deviation from the MPC protocol. In this example, an attestation condition can be that the certification server has certified that the MPC protocol is being followed appropriately. In some implementations, the TEE 106 is configured in such a way that the only inputs and outputs permissible are to communicate with other servers in the MPC group.

The attestation condition(s) can include a condition that the MPC application 107 is running inside of a secure uncompromised environment. For this condition to be met, the attestation module 108 can ensure that a digital signature of the TEE 106 is valid. For example, the manufacturer of the TEE 106 can provide, with each TEE 106 that it distributes, a digital signature that attests to the TEE 106 providing a secure environment to execute code. In some implementations, the manufacturer generates the digital signature by signing over the serial number or another unique identifier for the TEE 106 using a private key of the manufacturer. The attestation module 108 can verify the digital signature using a public key that corresponds to the private key of the manufacturer and the serial number or other identifier.

The attestation condition(s) can include a condition that the OS of the TEE 106 is secure. The developer of the OS can provide, with each instance of the OS that it distributes, a digital signature that attests to the fact that the OS is trustworthy. In some implementations, the developer generates the digital signature by signing over the serial number of another unique identifier for the instance of the OS using a private key of the developer. The attestation module 108 can verify the digital signature using a public key that corresponds to the private key of the developer and the serial number or other identifier.

The attestation condition(s) can include a condition that the TEE 106 is running an official build of a previously certified codebase for the MPC protocol that is known to implement the MPC protocol without malicious logic that may compromise the security and/or privacy of the secure computations and data used in the computations. In some implementations, the attestation module 108 can generate a hash of the code of the MPC application 107 using a hash function. The attestation module 108 can compare this generated hash to a known hash of the official build of the certified codebase. If the two hashes match, this attestation condition is met. If not, the attestation condition is not met.

If all attestation conditions are met, the attestation module 108 can generate an attestation token that attests to the fact the MPC protocol is being followed without deviation and that no other operations are being performed within the TEE 106. The attestation token can include one or multiple concatenated portions that include payload data, a timestamp field, and/or a digital signature field. The payload data can include the message, the digital signature for the TEE 106 and its unique identifier, and/or the digital signature for the TEE's OS and its unique identifier.

The payload data can also include a digital signature that indicates (or can be used to determine) that the TEE 106 running an official build of a previously certified codebase for the MPC protocol. This digital signature can be referred to as a digital signature for the MPC protocol. The attestation module 108 can generate this digital signature for the MPC protocol using a set of data and a private key of the TEE 106. Each TEE 106 can have a unique private key and public key that corresponds to (e.g., is mathematically linked to) the private key. That is, the TEE 106a can include a private key and public key that is different from the private key and public key of the TEE 106b.

The digital signatures for the TEE 106, the OS, and the confirmation of the official build of the previously certified codebase can be referred to as digital signatures for the MPC protocol executing on the TEE 106. All or some portion of this group of signatures can be used to establish a chain of trust for the environment in which the MPC protocol is executed in an MPC computer 105.

The set of data that the attestation module 108 signs over to generate the digital signature for the MPC protocol can include, for example, a message that indicates that the attestation conditions are met, e.g., "Attestation conditions passed." In some implementations, the set of data can include the codebase of the MPC application 107 or a hash of the codebase. Generating the digital signature of the cryptographic hash of the codebase rather than the codebase itself reduces the data size required to validate the signature and the processing power (e.g., number of CPU cycles) required to validate the digital signature. The reduced data size can increase data transmission speeds, reduce bandwidth consumption, and reduce data storage requirements. If the digital signature is over the entire codebase, a recipient that wants to validate the digital signature must somehow receive the codebase in its entirety, which is much bigger than the cryptographic hash of the codebase.

In some implementations, the set of data includes the hash of the codebase of the MPC application 107. In this way, the recipient (e.g., another MPC computer or a KMS) that verifies the attestation token can compare the hash of the codebase of the MPC application 107 to a hash of each of one or more certified codebases for the MPC protocol to verify that the TEE 106 is running an official build of the codebase.

The digital signature field can include a digital signature of the other data of the attestation token, e.g., of the payload data and/or timestamp. For example, the attestation module 108 can generate the digital signature by signing over this data using the private key of the TEE 106. This digital signature can be used by a recipient to ensure that the data of the attestation token has not been modified after the token was generated, e.g., in transit or by an intermediary.

The digital signatures described in this document can be generated using any digital signature generation algorithm with a corresponding private key. By way of example, the digital signature can be generated using algorithms such as RSA based signature schemes (e.g., RSA-PSS), Digital Signature Algorithm (DSA) or its elliptical curve variant ECDSA, Edwards-curve Digital Signature Algorithm, ElGamal signature scheme, etc.

When performing secure computations, the MPC computers 105 can send requests to the other MPC computers 105 and receive responses from the other MPC computers 105. For example, the MPC application 107a can send a request 123 to the MPC application 107b and the MPC application 107b can send a response 125 to the MPC application 107a based on the request.

At least a portion of the requests can include an attestation token, assuming that the attestation condition(s) are met by the MPC computer 105 sending the request. That is, the attestation module 108 of each TEE 106 can generate and add an attestation token to requests sent by the MPC application 107 if the attestation module 108 determines that each attestation condition has been met.

In some implementations, the attestation module 108 includes an attestation token in all requests if the attestation conditions are met. In this example, the MPC computer 105 can send the same attestation token with each request or generate a new attestation token for each request. In some implementations, a first request sent during a round of secure computations includes an attestation token but subsequent requests do not include attestation tokens.

In some implementations, the attestation module 108 of a MPC computer 105 generates and provides an attestation token in response to a query received from another MPC computer 105. In this example, each MPC computer 105 (or its TEE 106 or attestation module 108) can be configured to query each other MPC computer 105 for an attestation token to ensure that the other MPC computer(s) are trustworthy, e.g., that each other MPC computer meets all of the attestation conditions.

The attestation module 108 of each TEE 106 can be configured to verify that the attestation token is valid, e.g., prior to responding to a request received from another MPC computer 105. Example techniques for verifying that an attestation token is valid are described below with reference to FIG. 3. If the attestation token is valid, the attestation module 108 can enable the MPC application 107 to send a response to the MPC computer 105 from which the request was received. If the attestation token is not valid, the attestation module 108 of the recipient MPC computer 105 can prevent the MPC application 107 from responding to the request, stop all communications with the MPC computer that sent the request, and/or stop executing the MPC protocol to prevent the other MPC computer from performing any fraudulent activity. Similarly, if a request does not include an attestation token and the request is supposed to include the token or if a response to a query does not include an attestation token, the attestation module 108 of the recipient MPC computer 105 can perform the same actions. This prevents the other MPC computer from performing fraudulent activities or any other activities that may not be authorized by the MPC protocol, thereby preserving the privacy and security of the data of each MPC computer 105 involved in the secure computations.

Assuming that each MPC computer 105 is trustworthy and meet all of the attestation conditions, the MPC computers 105 can collaborate to perform secure computations, e.g., based on a request 113 received from a computer device 103. The request 113 can include shares of data for each MPC computer 105. For example, the computing device 103 can send a request 113 to MPC computer 105a with a first secret share of the data and a corresponding request 113 to MPC computer 105b with a second secret share of the data. The MPC computers 105 can perform secure computation using the shares of the data in ways that prevent each MPC computer 105 from accessing the other MPC computer's shares of the data in cleartext.

After performing the secure computations, the MPC computers 105 can provide a response with an MPC result 115 to the computing device 103. In some implementations, each MPC computer 105 can send a response that includes a share or shares of the result. For example, MPC computer 105a can send an MPC result 115 that includes a first secret share of the result and MPC computer 105b can send an MPC result 115 that includes a second secret share of the result. The computing device 103 can combine the secret shares to obtain the result in cleartext.

The network(s) 110 can include multiple additional devices, including, for example, gateways, modems, firewalls, routers, switches, etc. The network(s) 110 can include any number of computing devices (e.g., computer, servers, routers, network switches, etc.) that are configured to receive and/or transmit data within the networks 110. The networks 110 can include any number of hardwired and/or wireless connections. The computing device 103 and MPC computers 105 can communicate wirelessly (e.g., via WiFi, cellular, radio, etc.) with a transceiver that is hardwired (e.g., via a fiber optic cable, a CAT5 cable, etc.) to other computing devices within the networks 110. The networks 110 can include or can be virtual networks, such as a virtual network between multiple virtual machines executed by a single physical machine, or an abstract network such as an offline transfer of data via physically movable media (e.g., a Sneakernet, transferring data via tape media, CD-ROM, flash media, external hard drives, floppy disks, etc.).

Figure 2:
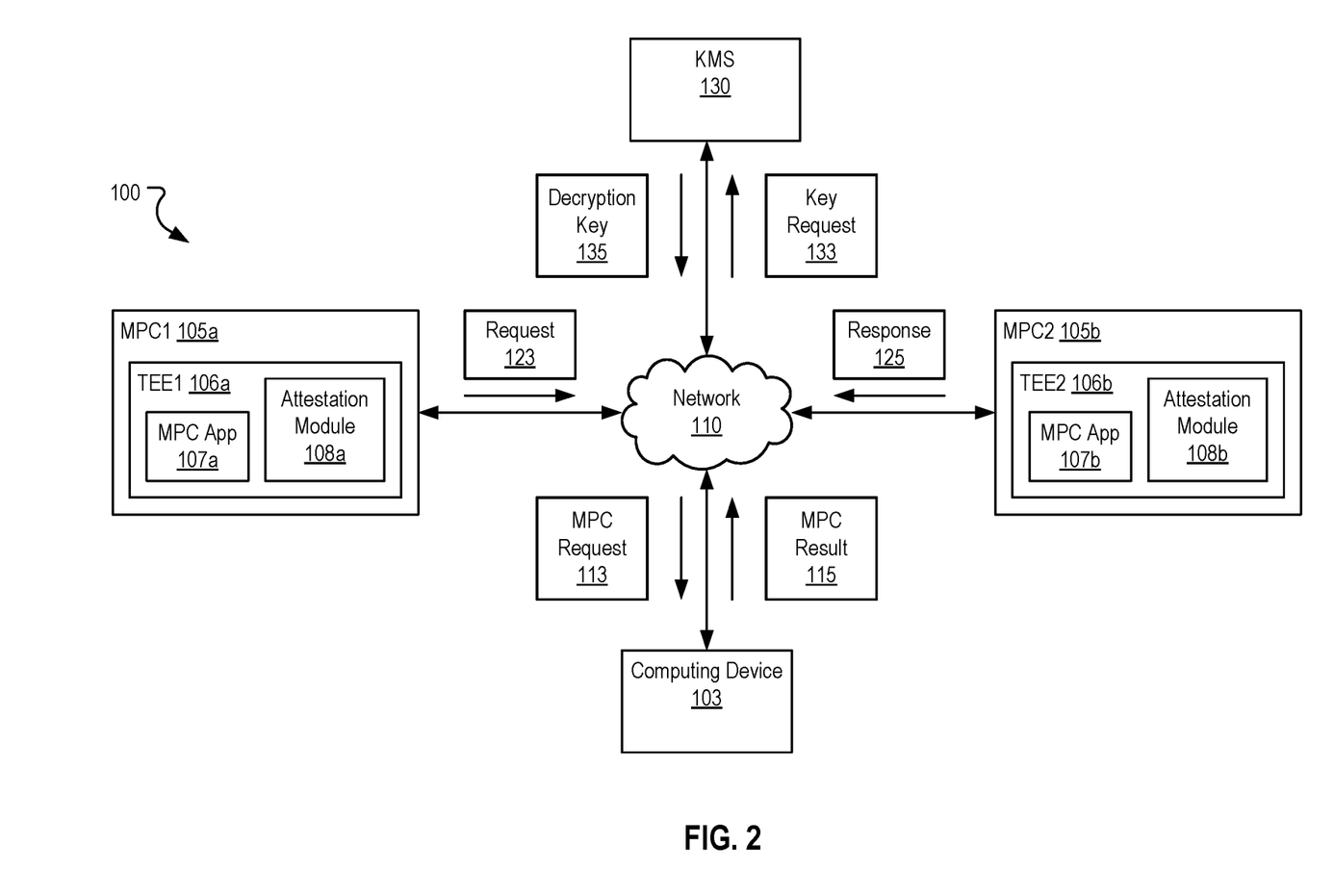
FIG. 2 is a block diagram of an environment in which example MPC applications execute MPC protocols within TEEs of MPC computers to perform secure computations and interact with a key management server to obtain decryption keys.

FIG. 2 is a block diagram of an example environment 200 in which example MPC applications execute MPC protocols within TEEs of MPC computers to perform secure computations and interact with a key management server to obtain decryption keys. The example environment 200 includes the same components as the example environment 100, but also includes a key management server (KMS) 130 in digital communication with the MPC computers 105. Identical components in FIGS. 1-2 share similar features as described in FIG. 1 above. FIG. 2 further includes a KMS 130 that may offloads some functionality performed by the attestation modules 108, e.g., the attestation token verification functionality.

The KMS 130 can include any type and form of computing devices, including desktop computers, servers, workstations, laptop computers, portable computers, embedded computers, or any other type and form of computing device. The KMS can include virtual machines executed by one or more physical computing devices, and can be configured as a server farm, cluster, or cloud of devices. The KMS 130 can securely and confidentially maintain encryption and/or decryption keys corresponding to multiple MPC computers 105. For example, the KMS 130 can maintain encryption and corresponding decryption keys for each MPC computer 105. If asymmetric cryptography is used, the encryption key can be a public key and the decryption key can be a private key corresponding to the public key.

In some implementations, there can be a dedicated KMS 130 for each party in a multi-party computation environment, e.g., the environment 200. For example, there can be a dedicated KMS 130 for MPC computer 105a and a different dedicated KMS 130 for MPC computer 105b. In this example, each MPC computer 105 can request its decryption key(s) from its dedicated KMS 130. In another example, multiple MPC computers 105 can share a KMS 130, e.g., by having a single KMS as in FIG. 2 or having one KMS 130 for every "N" MPC computers 105. Many variations are possible.

In this example, each MPC computer 105 can encrypt the data of its requests using the encryption key of the MPC computer to which the MPC computer 105 is sending the request. For example, MPC computer 105a can encrypt the data of a request sent to MPC computer 105b using the encryption key of MPC computer 105b. Similarly, MPC computer 105b can encrypt the data of a request sent to MPC computer 105a using the encryption key of MPC computer 105a.

To obtain its decryption key, each MPC computer 105 can send a key request 133 to the KMS server 130. The key request 133 can include an attestation token generated by the attestation module 108 of the MPC computer 105 that sent the key request 133, assuming that the attestation condition (s) are met. The KMS server 130 can evaluate the attestation token to determine whether it is valid using the verification techniques described below. If the attestation token is valid, the KMS server 130 can send the decryption key of the MPC computer 105 to the MPC computer 105 that sent the key request 133. In this way, the MPC computer 105 can decrypt the data of the requests sent from the other MPC computer(s) using the decryption key only if the attestation conditions are met and the attestation token is successfully verified by the KMS 130.

This can provide the same benefits as the environment 100 of FIG. 1, while shifting the attestation token verification to a trusted KMS 130. In some implementations, the KMS 130 is an MPC cluster that includes multiple MPC computers. In such an example, the key request can be sent in the form of respective secret shares for the MPC computers of the KMS MPC cluster.

Each MPC computer 105 can be configured to submit a key request 133 at the beginning of each cycle of secure computations used to generate an MPC result. For example, a new set of encryption/decryption keys can be used for each cycle of secure computations. A cycle of secure computations can include a set of computations to generate a result based on input data, e.g., input data received in an MPC request 113 received from a computing device 103. Using different keys for each cycle ensures that each MPC computer 105 is evaluated for trustworthiness regularly and prior to performing any round of secure computations.

In another example, the decryption keys can be rotated periodically, e.g., every five minutes, every ten minutes, every 30 minutes, every hour, every day, or based on another appropriate time period. To perform the key rotation, each MPC computer 105 would be required to request a new decryption key based on the time period so that each MPC computer 105 can be evaluated to ensure that the MPC protocol is being executed appropriately. This can reduce the computational and bandwidth costs associated with evaluating the MPC computers 105 for each input data set and the key distribution, for example, as there may be many requests with new input data sets each second, e.g., hundreds, thousands, or even millions per second.

Figure 3:
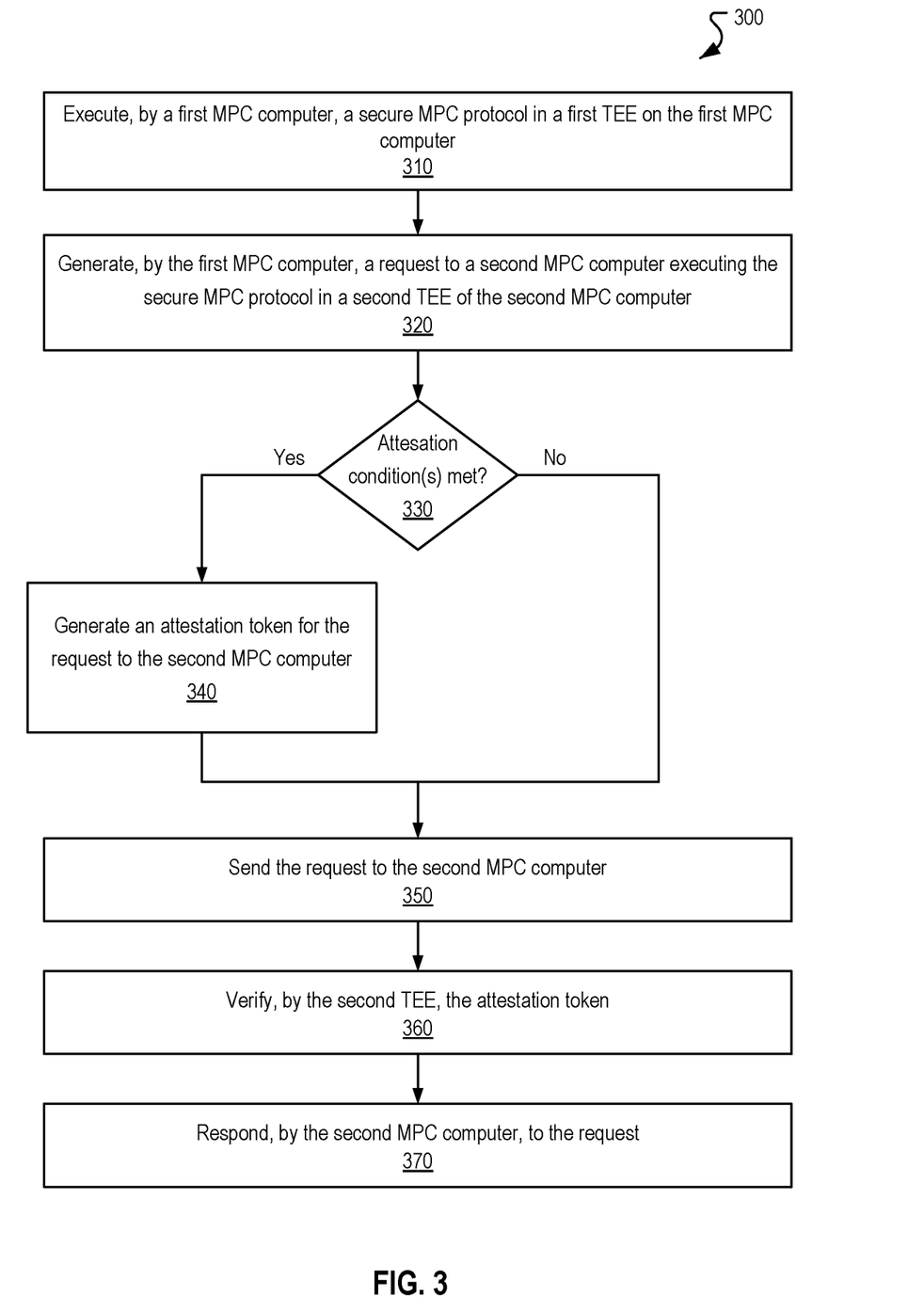
FIG. 3 is a flow diagram of an example process for communicating between MPC parties using an integration of MPC protocols with TEEs.

FIG. 3 is a flow diagram of an example process 300 for communicating between MPC computers using an integration of MPC protocols with TEEs. Operations of the process 300 can be implemented, for example, by the MPC computers 105 described above. Operations of the process 300 can also be implemented as instructions stored on one or more computer readable media which may be non-transitory, and execution of the instructions by one or more data processing apparatus can cause the one or more data processing apparatus to perform the operations of the process 300. For ease of description, the process 300 is described in terms of the MPC computers 105 of FIG. 1.

A first MPC computer 105a executes a secure MPC protocol in a first TEE 106a of the first MPC computer 105a (310). For example, an OS of the TEE 106a can start the secure MPC protocol using code of the MPC application 107a that is executed in the TEE 106a. The MPC application 107a can include a previously certified codebase for the secure MPC protocol. The secure MPC protocol can be predesigned for handling the honest-but-curious threat model(s) or semi-honest threat model(s).

The first MPC computer 105a generates a request to a second MPC computer 105b that is executing the secure MPC protocol in a second TEE 106b of the second MPC computer 105b (320). The request can include data, e.g., in the form of secret shares of the data, for use in performing secure computations based on the secure MPC protocol. In another example, the request can be a request for data from the second MPC computer 105b.

The attestation module 108a of the first MPC computer 105a determines whether one or more attestation conditions are met (330). As described above, the attestation module 108 can evaluate a set of one or more attestation conditions. The attestation conditions can include, for example, any one of, or any combination of the following attestation conditions: (1) the code running in the TEE 105a has not deviated from the MPC protocol, (2) no additional communications that are not part of the MPC protocol has been received or sent by any application in the TEE 106a, (3) the MPC application 107a is running inside of a secure uncompromised environment (e.g., the digital signature generated by the manufacturer of the TEE 106a is valid), (4) the OS of the TEE 106a is secure (e.g., the digital signature generated by the developer of the OS of the TEE 106a is valid), and (5) the TEE 106a is running an official build of a previously certified codebase for the MPC protocol that is known to implement the MPC protocol without malicious logic that may compromise the security and/or privacy of the secure computations and data used in the computations (e.g., a hash of the code of the MPC application 107a matches a known hash of the official build of the certified codebase). Other appropriate attestation conditions can also be used.

In some implementations, the attestation module 108a can collect signals for the various attestation conditions and send the signals to another server, e.g., a certification server or KMS, for evaluation. The server can respond to the attestation module 108a with data indicating whether the one or more attestation conditions are met.

In response to determining that the set of one or more attestation conditions are met, the TEE 106a (e.g., the attestation module 108a of the TEE 106a) generates an attestation token for the request to the second MPC computer 105b (340). In some implementations, the attestation token can be inserted into a predetermined location of the request. For example, the request may include a header and the attestation token may be inserted in the header. In some implementations, the request can be in the form of an attestation token. In this example, the payload data of the attestation token can include request parameters (e.g., data for use in computations) and this data can be protected by the digital signature of the attestation token along with the rest of the data of the attestation token.

As described above, the attestation token can include payload data, a timestamp field that includes a timestamp for when the attestation token is generated, and/or a digital signature field that includes a digital signature generated using a private key of the TEE 106a and the other data of the attestation token. The payload data can include the message, the digital signature for the TEE 106a and its unique identifier, the digital signature for the TEE's OS and its unique identifier, and/or a digital signature for the MPC protocol that indicates (or can be used to determine) that the TEE 106a running an official build of a previously certified codebase for the MPC protocol. The attestation token can also include request parameters and/or a cryptographic hash of the codebase being used to run the MPC protocol.

If one or more of the attestation conditions are not met, the TEE 106a may not generate an attestation token for the request. Instead, the TEE 106a can send the request without an attestation token or stop executing the MPC protocol without sending the request. In another example, the TEE 106a can generate an attestation token with data, e.g., in the payload data, that indicates that at least one attestation condition failed or that the first MPC computer 105a is not trustworthy.

The first MPC computer 105a sends the request and attestation token (if appropriate) to the second MPC computer 105b (350). The request can be communicated directly, via a network, or via any number of intermediary devices to the second MPC computer 105b.

The second MPC computer 105b verifies the attestation token (360). The second MPC computer 105b can verify that the attestation token is valid based on the timestamp of the attestation token, the digital signature of the data of the attestation token, and/or the digital signature(s) included in the payload data of the attestation token.

For example, the attestation module 108b of the second MPC computer 105b can determine whether the time indicated by the timestamp is within a threshold duration of a current time to ensure that the request is not stale. If the difference between the current time and the time indicated by the timestamp is less than the threshold duration, this verification check is passed successfully. If not, this verification check fails.

The attestation module 108b can use a public key of the TEE 106a to verify the digital signature generated using the data of the attestation token. If this verification is successful, this indicates that the data of the attestation token has not been modified since the attestation token was generated and this verification check is passed successfully. If the digital signature cannot be verified, the data of the attestation token has changed and this verification check fails.

The attestation module 108b can verify each digital signature included in the payload data of the attestation token. In some implementations, the attestation module 108b can verify the digital signature for the MPC protocol using the message that indicates that the attestation conditions are met (e.g., "Attestation conditions passed") and the public key of the TEE 106a.

In some implementations, the attestation module 108b can verify the digital signature of the TEE 106a using the public key of the manufacturer of the TEE and the serial number of the TEE 106a. Similarly, the attestation module 108b can verify the digital signature of the OS of the TEE 106a using the public key of the developer of the OS. If any of the digital signatures that are attempted to be verified are not verified successfully, the digital signature verification check fails. If all attempted signatures are verified successfully, the digital signature verification check is passed.

If all verification checks are passed, the attestation module 108b can determine that the attestation token is valid. If one or more verification checks fail, the attestation module 106 determines that the attestation token is not valid.

If the attestation token is valid, the second MPC computer 105b responds to the request (370). For example, the second MPC computer 105b can perform a secure computation, or some portion of the secure computation, using data in the payload of the request and provide a result of the secure computation to the first MPC computer 105a. In a particular example, the second MPC computer 105b can perform a portion of the secure computation until the computation reaches an intermediate step that involves the second MPC computer 105b to communicate with the first MPC computer 105a.

If the attestation token is not valid, the second MPC computer 105b can stop executing the MPC protocol and stop communicating with the first MPC computer 105a. For example, if the attestation token is not verified or the token is missing from the request, the second MPC computer 105b can conclude that the first MPC computer 105a executing the MPC protocol has been compromised or is otherwise unsecure and cannot be trusted.

Figure 4:
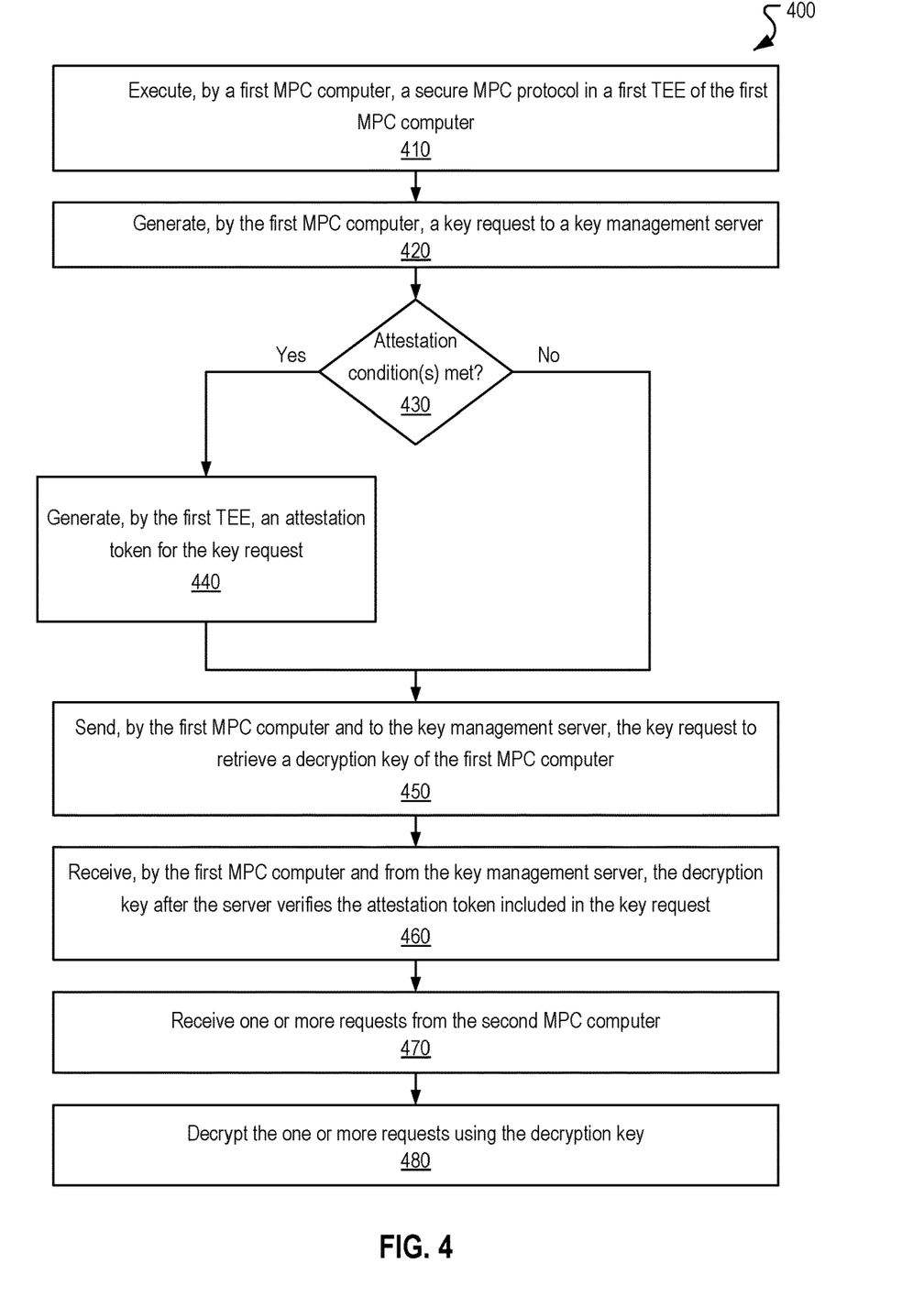
FIG. 4 is a flow diagram of an example process for communicating between MPC parties using an integration of MPC protocols with TEEs and a key management server.

FIG. 4 is a flow diagram of an example process 400 for communicating between MPC parties using an integration of MPC protocols with TEEs and a key management server. Operations of the process 400 can be implemented, for example, by the MPC computers 105 described above. Operations of the process 400 can also be implemented as instructions stored on one or more computer readable media which may be non-transitory, and execution of the instructions by one or more data processing apparatus can cause the one or more data processing apparatus to perform the operations of the process 400. For ease of description, the process 400 is described in terms of the MPC computers 105 of FIG. 2.

The process 400 is similar to the process 300 except that the KMS 130 communicates with each of the two MPC computers 105 of the MPC parties and offloads the attestation token checking operations from individual MPC computers 105 to the KMS 130. The KMS 130 also is responsible for storing and maintaining the cryptographical keys for each MPC party, e.g., the public and private keys for each MPC party. For example, the KMS 130 can be responsible for key rotation according to a predefined key rotation schedule.

A first MPC computer 105a executes a secure MPC protocol in a first TEE 106a of the first MPC computer 105a (410). For example, an OS of the TEE 106a can execute the secure MPC protocol using code of the MPC application 107a that is executed in the TEE 106a. The MPC application 107a can include a previously certified codebase for the secure MPC protocol.

The first MPC computer 105a generates a key request to the KMS (420). The key request can be a request to retrieve a decryption key of the MPC computer 105a for use in decrypting requests received from a second MPC computer 105b executing the secure MPC protocol in a second TEE 106b of the second MPC computer 105b.

The TEE 106a (e.g., the attestation module 108a of the TEE 106a) determines whether one or more attestation conditions are met (430). In some implementations, the attestation module 108a can collect signals for the various attestation conditions and send the signals to another server, e.g., a certification server or KMS, for evaluation. The server can respond to the attestation module 108a with data indicating whether the one or more attestation conditions are met. This determination can be the same or similar as the determination performed in operation (330) of FIG. 3.

In response to determining that the one or more attestation conditions are met, the TEE 106a (e.g., the attestation module 108a) can generate an attestation token for the key request (440). The attestation token can be generated as described above with reference to operation (340) of FIG. 3. The TEE 106 can insert the attestation token into the header of the request. In another example, the TEE 106 can insert request parameters into the payload data of the attestation token before generating the digital signature for the attestation token.

If one or more of the attestation conditions are not met, the TEE 106a may not generate and insert an attestation token into the request. Instead, the TEE 106a can send the request without an attestation token or stop executing the MPC protocol without sending the request. In another example, the TEE 106a can generate an attestation token with data, e.g., in the payload data, that indicates that at least one attestation condition failed or that the first MPC computer 105a is not trustworthy.

After the attestation token has been generated, the first MPC computer 105a can send the key request with the attestation token to the KMS 130 to retrieve the decryption key (450).

Upon receiving the communication from the first computing device, the KMS 130 verifies that the attestation token contained in the key request is valid. The KMS 130 can verify the attestation token, as described above with reference to operation (360) of FIG. 3.

If the attestation is verified successfully, the KMS 130 determines that the MPC protocol is being executed securely and uncompromised by the first MPC computer 105a, and the key request sent by the first computing device can be answered by sending the first MPC computer 105a its decryption key. The KMS 130 then sends the decryption key to the first MPC computer 105a.

The first MPC computer 105 receives the decryption key from the KMS 130 (460). The decryption key can be used by the first MPC computer 105a to decrypt messages received from other MPC parties, e.g., from the second MPC computer 105b. Such messages are encrypted by the other MPC computer using the corresponding encryption key of the first MPC computer 105a so that the first MPC computer 105a can decrypt the contents of the message and perform secure computation using the contents.

The first MPC computer 105a receives one or more requests from the second MPC computer 105b (470). The first MPC computer 105a uses the decryption key to decrypt the contents of the requests (480).

In cases where the first MPC computer 105a needs to send communication to other parties, the first MPC computer 105a encrypts the communication, e.g., a request or a response, using an encryption key of the recipient party, e.g., the second MPC computer 105b. The first MPC computer 105a can obtain the encryption key of the second MPC computer 105a from the KMS 130 for the MPC setup. If each MPC computer has a dedicated KMS, the first MPC computer 105a can obtain the encryption key of the second MPC computer 105b from the KMS for the second MPC computer 105b.

Figure 5:
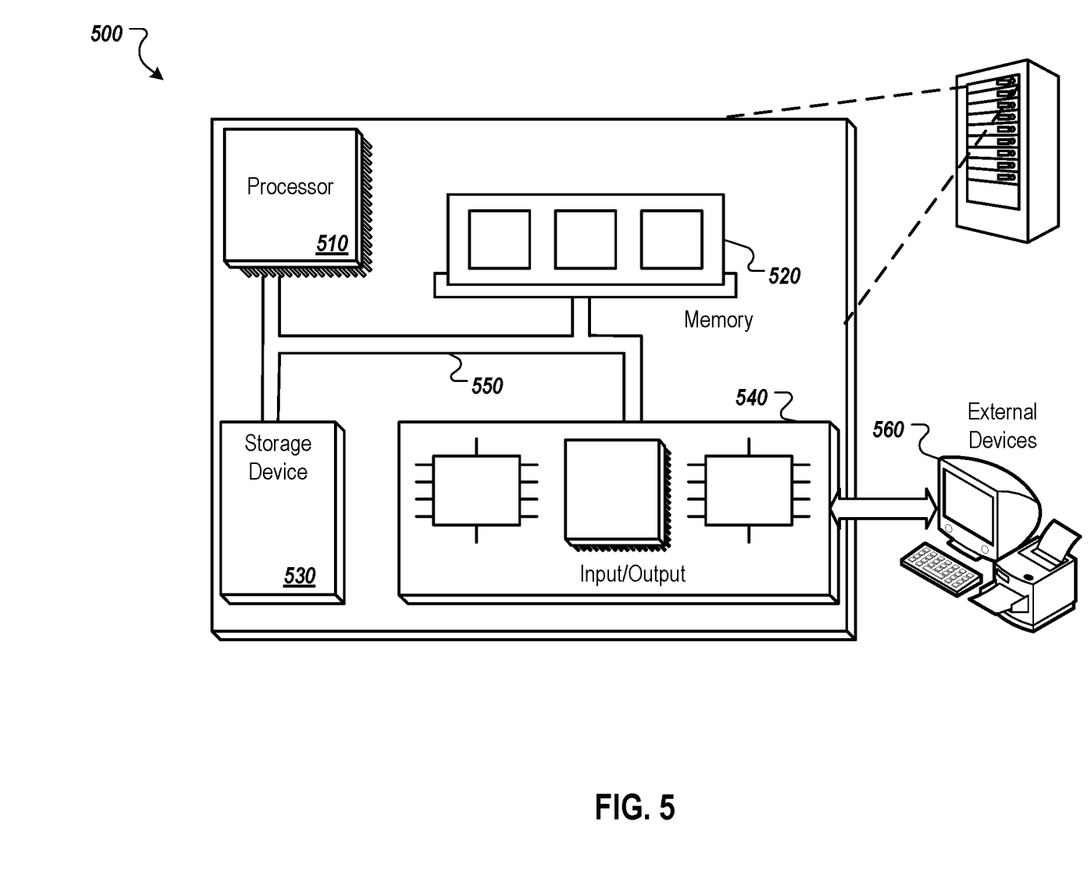
FIG. 5 is a block diagram of an example computer system.

FIG. 5 is a block diagram of an example computer system 500 that can be used to perform operations described above. The system 500 includes a processor 510, a memory 520, a storage device 530, and an input/output device 540. Each of the components 510, 420, 530, and 540 can be interconnected, for example, using a system bus 550. The processor 510 is capable of processing instructions for execution within the system 500. In some implementations, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In some implementations, the memory 520 is a volatile memory unit. In another implementation, the memory 520 is a non-volatile memory unit.

The storage device 530 is capable of providing mass storage for the system 500. In some implementations, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In some implementations, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 560, e.g., keyboard, printer and display devices. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
   executing, by a first multi-party computation (MPC) computer, a secure MPC protocol in a first trusted execution environment (TEE) of the first MPC computer;
   generating, by the first MPC computer, a first request to a second MPC computer executing the secure MPC protocol in a second TEE of the second MPC computer;
   determining, by the first TEE, that one or more attestation conditions are met by the first MPC computer executing the secure MPC protocol in the first TEE;
   in response to determining that the one or more attestation conditions are met, generating, by the first TEE, an attestation token comprising one or more digital signatures for the secure MPC protocol executing in the first TEE;
   sending, by the first MPC computer, the attestation token with the first request to the second MPC computer;
   generating, by the first MPC computer, a second request to the second MPC computer executing the secure MPC protocol in the second TEE;
   determining, by the first TEE, that the one or more attestation conditions are not met by the first MPC computer executing the secure MPC protocol in the first TEE; and
   sending, by the first MPC computer, the second request to the second MPC computer, wherein the second request does not include any attestation token,
   wherein the second MPC computer is configured to stop executing the secure MPC protocol upon receiving the second request that does not include any attestation token.

2. The computer-implemented method of claim 1, wherein the first request comprises a header, the method further comprising inserting the attestation token into the header of the first request.

3. The computer-implemented method of claim 1, wherein the attestation token comprises request parameters of the first request.

4. The computer-implemented method of claim 1, wherein the one or more digital signatures for the secure MPC protocol of the attestation token comprises at least one of (i) a first digital signature of the secure MPC protocol, (ii) a second digital signature of the first TEE generated by a manufacturer of the first TEE or (iii) a third digital signature of an operating system of the first TEE generated by a provider of the operating system.

5. The computer-implemented method of claim 1, wherein determining that the one or more attestation conditions are met by the first MPC computer executing the secure MPC protocol in the first TEE comprises:
   determining that an MPC application executing the secure MPC protocol is running securely in the first TEE on the first MPC computer.

6. The computer-implemented method of claim 1, wherein determining that the one or more attestation conditions are met by the first MPC computer executing the secure MPC protocol in the first TEE comprises:
   determining that the first TEE is running a predetermined codebase for the secure MPC protocol, wherein the predetermined codebase comprises code certified to implement the secure MPC protocol without malicious operations.

7. A computer-implemented method comprising:
   executing, by a first multi-party computation (MPC) computer, a secure MPC protocol in a first trusted execution environment (TEE) of the first MPC computer;
   generating, by the first MPC computer, a first request to a second MPC computer executing the secure MPC protocol in a second TEE of the second MPC computer;
   determining, by the first TEE, that one or more attestation conditions are met by the first MPC computer executing the secure MPC protocol in the first TEE;
   in response to determining that the one or more attestation conditions are met, generating, by the first TEE, an attestation token comprising one or more digital signatures for the secure MPC protocol executing in the first TEE;
   sending, by the first MPC computer, the attestation token with the first request to the second MPC computer;
   generating, by the first MPC computer, a second request to the second MPC computer executing the secure MPC protocol in the second TEE;
   determining, by the first TEE, that the one or more attestation conditions are not met by the first MPC computer executing the secure MPC protocol in the first TEE; and sending, by the first MPC computer, the second request to the second MPC computer, wherein the second request comprises a second attestation token comprising data indicating that at least one attestation condition is not met, wherein the second MPC computer is configured to stop executing the secure MPC protocol upon receiving the data indicating that the first MPC computer is not trustworthy.

8. The computer-implemented method of claim 1, wherein the secure MPC protocol is based on an honest-but-curious threat model, and wherein executing the secure MPC protocol in the first TEE and the second TEE satisfies a malicious threat model.

9. A system comprising:
one or more processors; and
one or more storage devices storing instructions that, when executed by the one or more processors, cause the one or more processors to perform operations comprising:
   executing, by a first multi-party computation (MPC) computer, a secure MPC protocol in a first trusted execution environment (TEE) of the first MPC computer;
   generating, by the first MPC computer, a first request to a second MPC computer executing the secure MPC protocol in a second TEE of the second MPC computer;
   determining, by the first TEE, that one or more attestation conditions are met by the first MPC computer executing the secure MPC protocol in the first TEE;
   in response to determining that the one or more attestation conditions are met, generating, by the first TEE, an attestation token comprising one or more digital signatures for the secure MPC protocol executing in the first TEE;
   sending, by the first MPC computer, the attestation token with the first request to the second MPC computer;
   generating, by the first MPC computer, a second request to the second MPC computer executing the secure MPC protocol in the second TEE;
   determining, by the first TEE, that the one or more attestation conditions are not met by the first MPC computer executing the secure MPC protocol in the first TEE; and
   sending, by the first MPC computer, the second request to the second MPC computer, wherein the second request does not include any attestation token,
   wherein the second MPC computer is configured to stop executing the secure MPC protocol upon receiving the second request that does not include any attestation token.

10. A computer-implemented method comprising:
   executing, by a first multi-party computation (MPC) computer, a secure MPC protocol in a first trusted execution environment (TEE) of the first MPC computer;
   generating, by the first MPC computer for sending to a key management server, a key request to retrieve a decryption key for decrypting requests received from a second MPC computer executing the secure MPC protocol in a second TEE of the second MPC computer;
   determining, by the first TEE, that one or more attestation conditions are met by the first MPC computer executing the secure MPC protocol in the first TEE;
   in response to determining that the one or more attestation conditions are met, generating, by the first TEE, an attestation token comprising one or more digital signatures for the secure MPC protocol executing in the first TEE;
   sending, by the first MPC computer and to the key management server, the attestation token with the key request to retrieve the decryption key;
   receiving, by the first MPC computer and from the key management server, the decryption key after the key management server verifies the attestation token included in the key request;
   receiving one or more requests from the second MPC computer; and
   decrypting each of the one or more requests using the decryption key.

11. The computer-implemented method of claim 10, further comprising:
   generating an encrypted request by encrypting, by the first MPC computer, a request to the second MPC computer using an encryption key of the second MPC computer; and
   sending, by the first MPC computer, the encrypted request to the second MPC computer executing the secure MPC protocol in the second TEE.

12. The computer-implemented method of claim 10, wherein the key request comprises a header, the method further comprising inserting the attestation token into the header of the key request.

13. The computer-implemented method of claim 10, wherein the one or more digital signatures for the secure MPC protocol of the attestation token further comprises at least one of (i) a first digital signature of the secure MPC protocol, (ii) a second digital signature of the first TEE generated by a manufacturer of the first TEE, or (iii) a third digital signature of an operating system of the first TEE generated by a provider of the operating system.

14. The computer-implemented method of claim 10, wherein determining that the one or more attestation conditions are met by the first MPC computer executing the secure MPC protocol in the first TEE comprises:
   determining that an MPC application executing the secure MPC protocol is running securely in the first TEE on the first MPC computer.

15. The computer-implemented method of claim 10, wherein determining that the one or more attestation conditions are met by the first MPC computer executing the secure MPC protocol in the first TEE comprises:
   determining that the first TEE is running a predetermined codebase for the secure MPC protocol, wherein the predetermined codebase comprises code certified to implement the secure MPC protocol without malicious operations.

16. The computer-implemented method of claim 10, further comprising:
   generating, by the first MPC computer, a second request to the second MPC computer;
   determining, by the first TEE, that the one or more attestation conditions are not met by the first MPC computer executing the secure MPC protocol in the first TEE; and
   sending, by the first MPC computer, the key request to the key management server, wherein the second request does not include any attestation token,
   wherein the request without attestation token inserted by the TEE is configured to trigger the key management server to send a notification to the second MPC computer to stop executing the second MPC protocol upon receiving the notification.

17. The computer-implemented method of claim 10, further comprising:
    generating, by the first MPC computer, a second request to the second MPC computer;
    determining, by the first TEE, that the one or more attestation conditions are not met by the first MPC computer executing the secure MPC protocol in the first TEE; and
    sending, by the first MPC computer, the key request to the key management server, wherein the second request comprises a second attestation token comprising data indicating that that at least one attestation condition is not met,
    wherein the data indicating that the first MPC computer is not trustworthy triggers the key management server to send a notification to the second MPC computer to stop executing the second MPC protocol upon receiving the notification.

18. The computer-implemented method of claim 10, wherein the secure MPC protocol is based on an honest-but-curious threat model, and wherein executing the secure MPC protocol in the first TEE and the second TEE satisfies a malicious threat model.

19. A system comprising:
    one or more processors; and
    one or more storage devices storing instructions that, when executed by the one or more processors, cause the one or more processors to perform operations comprising:
        executing, by a first multi-party computation (MPC) computer, a secure MPC protocol in a first trusted execution environment (TEE) of the first MPC computer;
        generating, by the first MPC computer for sending to a key management server, a key request to retrieve a decryption key for decrypting requests received from a second MPC computer executing the secure MPC protocol in a second TEE of the second MPC computer;
        determining, by the first TEE, that one or more attestation conditions are met by the first MPC computer executing the secure MPC protocol in the first TEE;
        in response to determining that the one or more attestation conditions are met, generating, by the first TEE, an attestation token comprising one or more digital signatures for the secure MPC protocol executing in the first TEE;
        sending, by the first MPC computer and to the key management server, the attestation token with the key request to retrieve the decryption key;
        receiving, by the first MPC computer and from the key management server, the decryption key after the key management server verifies the attestation token included in the key request;
        receiving one or more requests from the second MPC computer; and
        decrypting each of the one or more requests using the decryption key.

* * * * *